United States Patent [19]
Ahlen

[11] 3,734,252
[45] May 22, 1973

[54] IMPROVEMENTS IN AND RELATING TO FORWARD/REVERSE GEAR TRANSMISSIONS

[75] Inventor: Karl Gustav Ahlen, Stockholm, Sweden

[73] Assignee: S.R.M. Hydromekanik AB, Stockholm, Vallingby, Sweden

[22] Filed: May 10, 1971

[21] Appl. No.: 141,633

[30] Foreign Application Priority Data

Jan. 27, 1971 Great Britain.....................52,632/71
Oct. 27, 1970 Italy..................................7059 A/70

[52] U.S. Cl. ...............192/3.52, 192/3.57, 192/3.63, 74/780
[51] Int. Cl. ............................................B60k 21/00
[58] Field of Search...........................192/3.52, 3.57; 74/780

[56] References Cited

UNITED STATES PATENTS

| | | | |
|---|---|---|---|
| 3,128,642 | 4/1964 | Fischer et al. | 192/3.57 X |
| 3,557,918 | 1/1971 | Akima et al. | 192/3.57 |
| 2,209,980 | 8/1940 | Johnson | 74/780 |
| 2,358,746 | 9/1944 | Tandler et al. | 74/780 X |
| 919,538 | 4/1909 | Chevrolet | 74/780 X |
| 3,344,896 | 10/1967 | Rasmussen | 192/3.57 |

FOREIGN PATENTS OR APPLICATIONS 482,775 4/1938 Great Britain..........................74/780

*Primary Examiner*—Benjamin W. Wyche
*Attorney*—Larson, Taylor and Hinds

[57] ABSTRACT

A forward/reverse gear transmission of the planet gear type including input and output members and a planet gear carrier and constructed to provide forward, reverse and release operation. The gear comprises a first, second and third coupling of which the first serves to connect and disconnect the input member and a driving source, the second serves to connect and disconnect the input and output members and the third clutch serves to selectively hold the planet gear carrier against rotation. The gear also includes a control means for allowing engagement of the first coupling only when the second clutch effects drive between the input and output members or when the third coupling holds the planet gear against rotation. Moreover, the gear includes means for controlling engagement of said second and third couplings so that only one of said couplings is engaged at any one time.

16 Claims, 8 Drawing Figures

Patented May 22, 1973 3,734,252

IMPROVEMENTS IN AND RELATING TO FORWARD/REVERSE GEAR TRANSMISSIONS

This invention relates to a system for transmitting torque from a driving source and more particularly to a system embodying a forward/reverse gear of the planet gear type.

Many forward/reverse gear transmission constructions have been used in connection with mechanical and hydraulic transmissions some of which require a power shift when a gear shift should be possible with the vehicle moving, others of which require that the vehicle is stationary during the shift and others of which fulfil a demand that the whole gear arrangement should rotate as a unit when moving in one direction.

It is an object of the invention to provide a forward/reverse gear which is suitable for use in transmissions not only for vehicles requiring the same forward and reverse speeds but also for application to buses and trucks.

A further object of the invention is to provide a forward/reverse gear for use in torque converter transmissions having a high torque multiplication and thus requiring a forward/reverse gear adapted to transfer a very high torque without necessitating large dimensions thereof.

According to this invention a forward/reverse gear of the planet gear type including input and output members and a planet gear carrier and constructed to provide forward, reverse and release operation comprises a first coupling for connecting and disconnecting the input member and a driving source, a second coupling for mutual connection and disconnection of said input and output members, a third coupling for selectively holding the planet gear carrier against rotation, control means allowing engagement of said first coupling only when said second coupling effects drive between said input and said output members or when said third coupling holds the planet gear against rotation and means for controlling engagement of said second and third couplings so that only one of said couplings is engaged at any one time.

The invention also includes a system for transmitting torque from a driving source and including a forward/reverse gear of the planet gear type comprising a wherein the first coupling comprises a friction clutch interposed between the driving source and the gear, a servomotor operative to connect or disconnect the friction clutch, said second coupling comprises means to hold the input and output members of said gear selectively against angular relative displacement and said third coupling comprises means to hold the planet gear holder of said gear against rotation when the second coupling means for said members is inoperative.

In a preferred embodiment of the invention the input and output members and th planet gears of the forward/reverse gear comprise bevel gears.

The invention will be more fully described hereinafter by way of example with reference to the embodiment thereof shown in the accompanying drawings in which.

Figure 1:
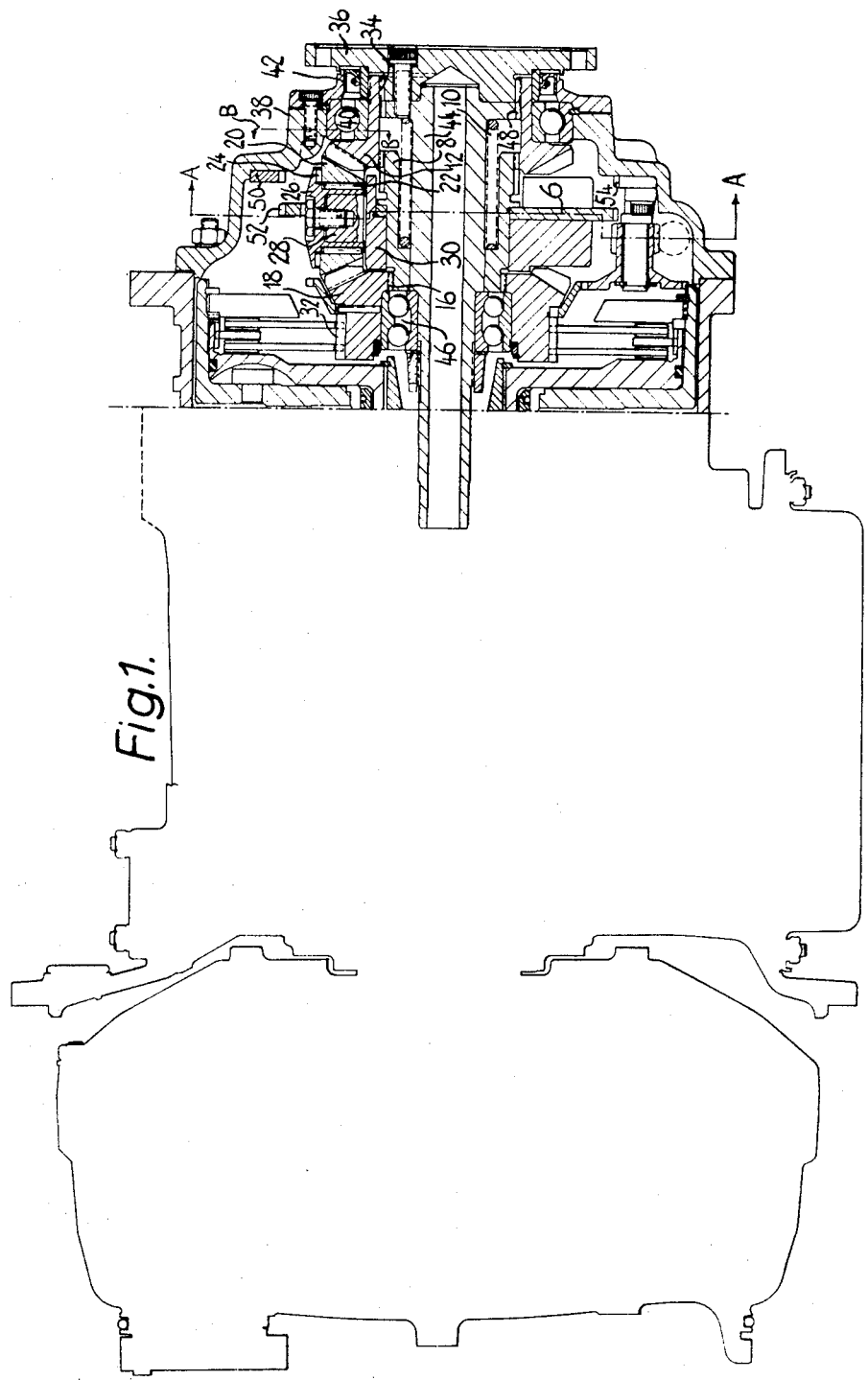
FIG. 1 shows a longitudinal section through the forward/reverse gear embodied in the transmission of a torque converter.

Referring to FIG. 1, this shows the overall transmission including at the left side thereof a conventional torque converter having a direct drive clutch and on the righthand side thereof a bevel gear arrangement having a gear connected to an input shaft, a gear connected to an output shaft and a planet gear holder located between the input and output gears and having mounted thereon two or more planet gears meshing with the input and output gears. The shaft extending through the gear may be connected to the input or output end and has one gear non-rotationally connected thereto and the other gear journalled thereon in such manner as to determine the relative axial positions of the gears. The planet gear holder is freely rotationally mounted between the gears and is self-adjusting in its position.

Figure 2:
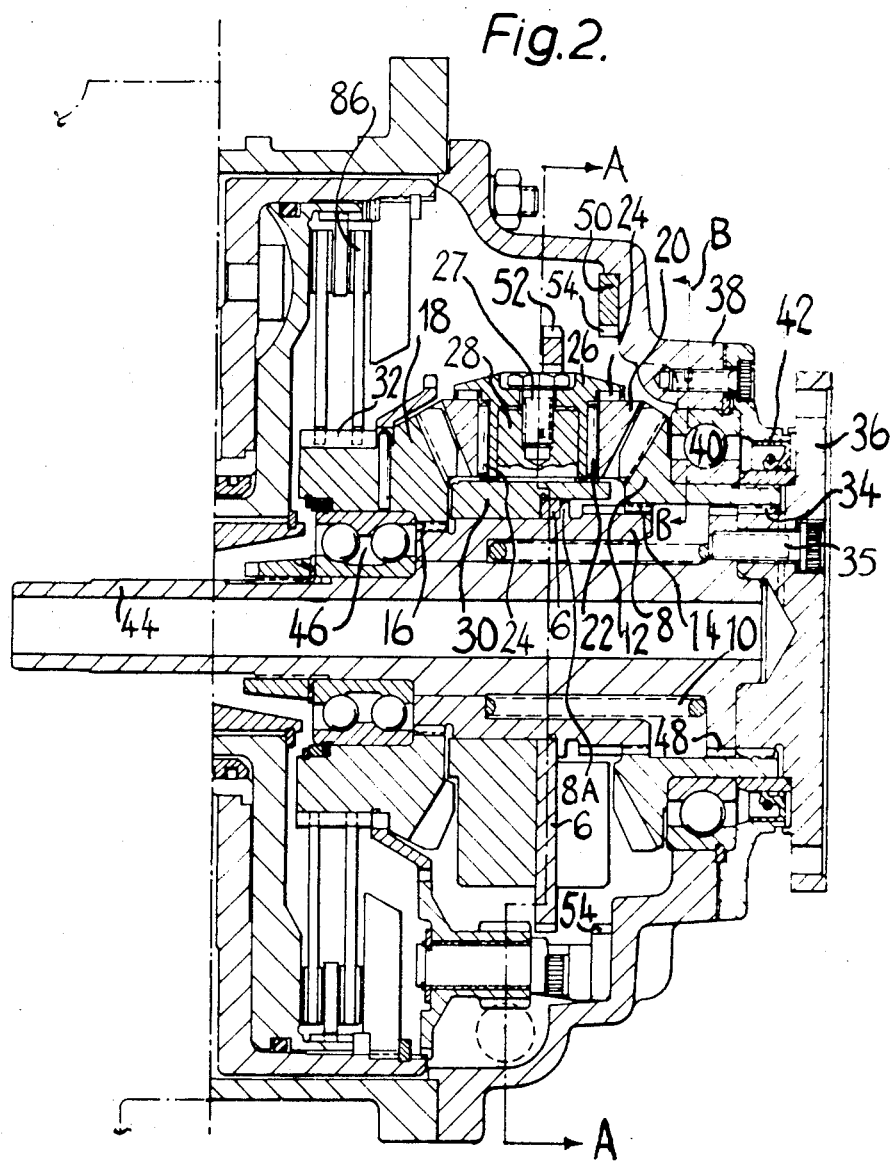
FIG. 2 shows the gear of FIG. 1 to an enlarged scale.

More specifically, and referring to FIG. 2, the planet gear holder 30 is of integral construction formed with raidal projections 28 on which planet gears 20 are mounted. A mounting sleeve 26 surrounds each projection 28 and is secured thereto by a screw 27. Bearings 24 and 22 are interposed between the sleeve 26 and the bevel pinion 20 to determine the radial position of the latter and allowing its free rotation on the sleeve 26.

Figure 7:
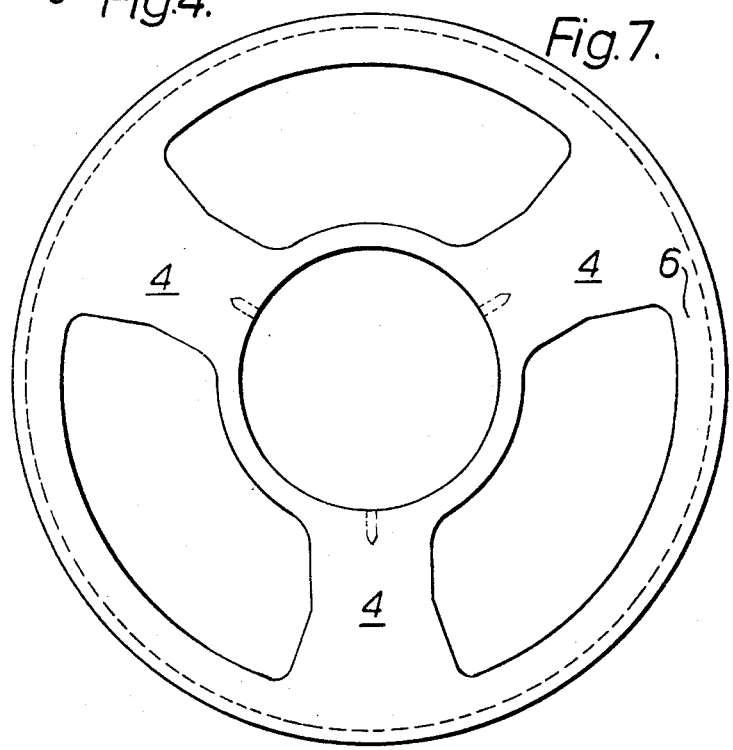
FIG. 7 shows a plate cooperating with the planet gear holder to prevent rotation of the latter.

The planet gear holder 30 is formed with radially extending recesses 2 (FIG. 6) located between adjacent projections 28, and each adapted to receive a spoke 4 of a plate 6 (FIGS. 3 and 7) mounted so as to be axially displaceable relatively to the holder 30. The plate 6 bears axially against a collar 8A on a sleeve 8 which is axially displaceable along the shaft 44 of the gear. The sleeve 8 is normally maintained in its left hand position (FIG. 2) by a spring 10. The sleeve 8 is rotationally secured to the output gear 12 by a spline connection 14 and in its left hand position is rotationally secured to the input gear 18 by a spline coupling 16.

Thus, forward drive is normally effected from the gear 18 which is driven through a spline coupling 32 from a friction coupling 86 connected in the transmission from a driving source, for instance a torque converter, then through the spline connection 16 to sleeve 8, spline coupling 14 to output gear 12 and thence through a spline coupling 34 to an output flange 36 the sleeve 8 and its splines thus forming a second coupling. Friction coupling 86, which is of a type shown in greater detail in my earlier U.S. Pat. No. 3,542,177, includes a drive input member 80 which forms with piston 81 a chamber 82. When a pressure fluid is introduced into 82, the piston 81 is moved to the left and this carries with it the member 83 which urges frictionally together the outer disc 84 splined to member 80 and the inner discs 85 splined at 32 to the input member 18, thus establishing the drive connection between members 80 and 18. The gear 12 is journalled in the stationary casing 38 of the gear through a ball bearing 40, the gear-containing space being sealed by a seal 42. The gears 12 and 18 are maintained in desired axial spacing by the shaft 44 rotationally connected to the gear 12 by a spline 48 and to the output flange 36 by screws 35 and provided with an axial thrust ball bearing 46 between said shaft and the gear 18. The provision of the splines 48 on the shaft 44 is to facilitate the mounting of the shaft 44 within the gear 12 whereupon the splines 48 engage the splines 34 on the gear 12.

The plate 6 is formed at its outer periphery with a spline ring 52 which is adapted to engage with splines 54 formed on a ring 50 rigidly mounted on the stationary casing 38 the splines 52 and 54 forming a third coupling. A lever 56 (FIG. 4) having a forked end is pivotally mounted on the casing 38 at 56a and has its opposite end 62 in contact with the plate 6. The forked end bears against a member 60 of a servomotor 58 also mounted on the casing 38. When the servomotor is actuated the member 60 moves to the left carrying the forked end of lever 56 with it, whereby the end 62 moves to the right and displaces the plate 6 to the right. Plate 6 carries the sleeve 8 with it to the right against the force of spring 10 firstly disconnecting the spline coupling 16 and then tending to cause engagement of the splines 52 and 54 which have their noses inclined to facilitate engagement.

The movement of the engine carrying the torque converter and the casing of the reverse gear, will produce coupling of the splines 52, 54 by the plate 6 being allowed to rotate, the gear 18 being disconnected from its driving source.

Figure 5:
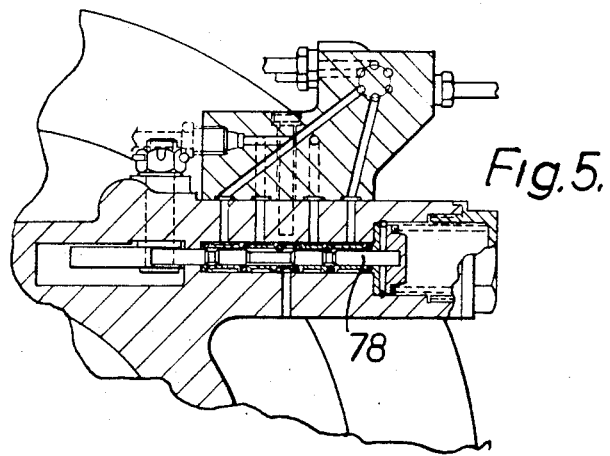
FIG. 5 is a section along the line B — B of FIGS. 1 and 2.
Figure 8:
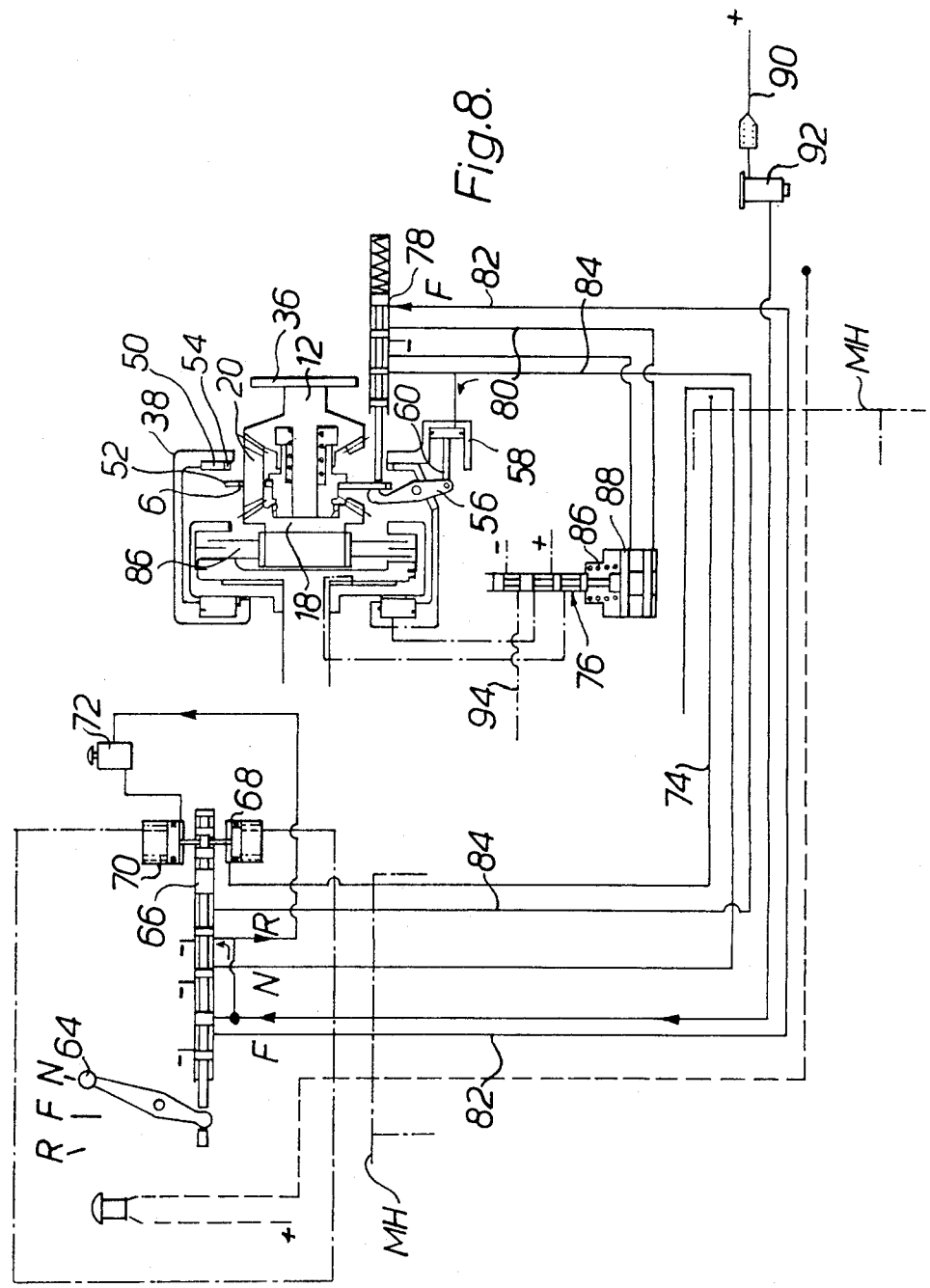
FIG. 8 shows schematically a remote control diagram for operation of the gear.

As shown in the remote control diagram of FIG. 8 movement of the plate 6 actuates a valve 78 shown generally in FIG. 5. The valve 78 acts to ensure that the gear 18 is connected to a driving source only when the plate 6 is moved to its outer positions, that is only when either forward or reverse is completely coupled.

Figure 3:
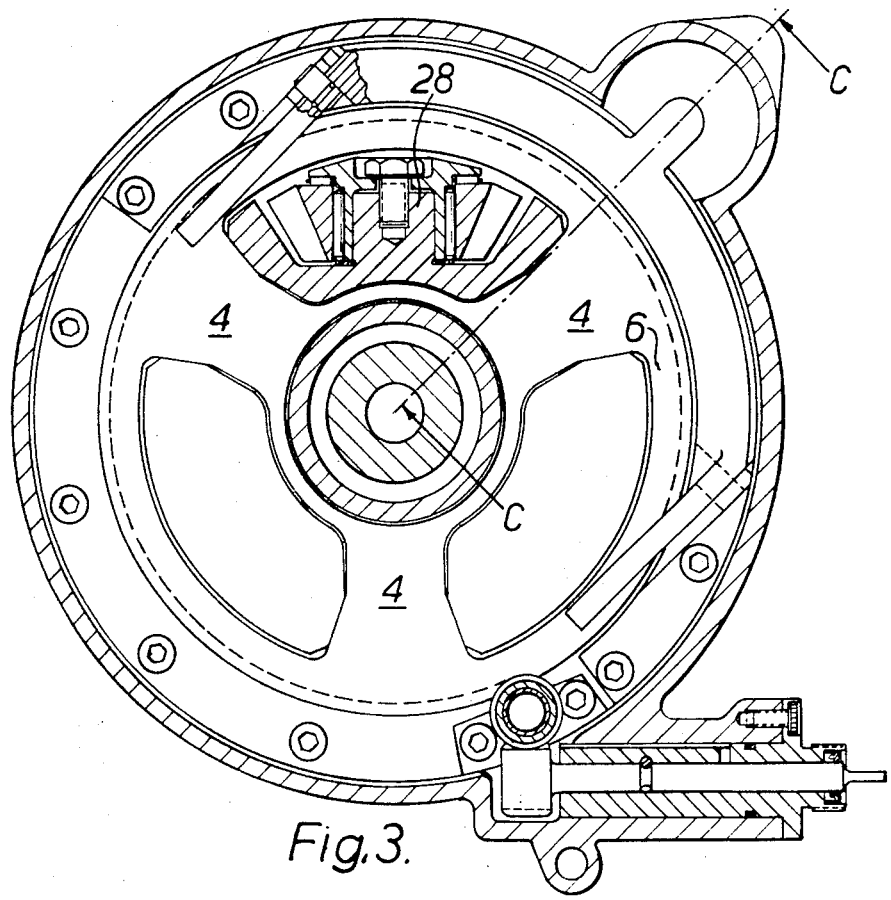
FIG. 3 is a section along the line A — A of FIGS. 1 and 2.
Figures 4, 6:
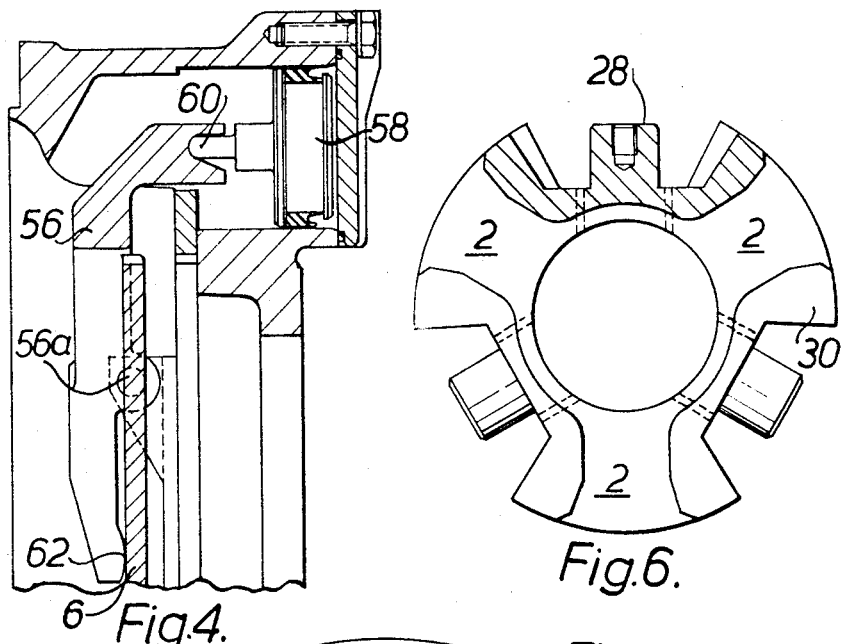
FIG. 4 is a section along the line C — C of FIG. 3.
FIG. 6 shows the planet gear holder of the gear.

FIG. 8 shows diagrammatically a compressed air control system and a valve arrangement for shift between neutral forward and reverse, including also the friction clutch 86 between the driving source and the forward/reverse gear above described and the valve 78 shown in FIG. 3. A manipulating lever 64 is adapted to move a valve 66 under the control of the driver. The valve 66 is provided with two locking devices 68 and 70 moved into operative position by springs and released by air pressure. The valve 66 cannot be moved unless compressed air is led to both locking devices 68, 70. It is to be noted that the device 70 is not normally necessary but is provided to satisfy requirements of certain bus companies. The locking device 70 may be released by manual operation of a valve 72.

The locking device 68 communicates through a pipe 74 with a source of pressure air responsive to the release of the throttle of the driving engine. The pipe 74 forms part of a multiple hose indicated by the dot-dash lines MH. In other words, shift between forward and reverse is allowable at low vehicle speeds and thus in practice a torque converter in the transmission can be utilised as an emergency brake. It is, in some cases, advisable to cause communication between the lock 70 and the compressed air actuating the wheel brakes which then requires both release of the throttle and application of the wheel brakes before shift takes place, or as described above that the driver manually operates the valve 72 and has released the throttle pedal, before shift takes place.

These precautions are not wholly necessary for the described forward/reverse gear since movement of the valve 66 to change the connection when moving from neutral to forward will connect the gear 18 with the driving source only when a valve 76 is actuated. To actuate this valve 76 compressed air must flow through the valve 78 which, if the forward/reverse gear is correctly engaged in forward by the spring 10, allows air to pass from pipe 82 to pipe 80 which acts against piston 89 to move it upwardly to actuate valve 76 to effect connection of gear 18 with the driving source. If the sleeve 8 is not in the correct position the valve 78 will not allow compressed air to pass to the valve 76.

This control is provided to avoid wear of the spline connection 16 due to rubbing. If the splines 16 do not couple, either the engine is stationary or mechanical trouble has arisen. In all normal operations coupling takes place without any risk of the splines mutually binding. The valve arrangement described above is provided to avoid damage due, for instance, to the locking of the sleeve 8. When the valve 66 is moved to the reverse position the pipes 80 and 82 will be vented before pressure air passes to the piston of servomotor 58 through pipe 84, which means that the coupling between gear 18 and the driving source is released. When the plate 6 engages with the ring 50 via splines 52, 54 the valve 78 has opened the connection between pipes 83 and 84 which moves the piston 88 upwardly to actuate valve 76 to connect the coupling provided that the engagement of the splines 52, 54 is complete.

It has been described above that the gear 18 can be coupled to the driving source only if the forward/reverse gear is completely engaged in the position for forward or reverse drive, due to the valve 78 sensing the position of the plate 6 providing the correct position of the gear, before the friction clutch is engaged by movement of said valve 76. If, for any reason, during operation of the gear, the dog clutch of the forward/reverse gear then engaged should start to disengage due, for instance, to non-alignment or a worn spline coupling, the valve 76 will move to a position under the action of spring 96 disconnecting the friction clutch before disengagement of the spline coupling. Further, if, for instance the air pressure should sink when driving in reverse the friction clutch 86 will be disconnected thus protecting the spline couplings from destruction.

In FIG. 8, 90 represents the pressure air line having an air filter and water trap 92. The line 94 from valve 76 is connected to the torque converter to provide direct drive disconnection when the line 94 is vented.

What is claimed is:

1. In combination, a torque converter having rotating parts drivable by a drive source, a forward/reverse gear transmission of the planetary gear type downstream from the torque converter, said forward/reverse gear including an input member drivingly engageable with the output of the torque converter, an output member and a planetary gear engaging both the input member and the output member on a planetary gear carrier which is rotatable about an axis, a first coupling means for selectively drivingly engaging and disengaging the input member of the forward/reverse gear with the drive source, a second coupling means for selectively drivingly engaging the said input and output members of the forward/reverse gear directly together in a second coupling engaged position for rotation of the output member in a forward direction, a third coupling means selectively engageable to prevent the planetary gear carrier from rotating about said axis and also to disconnect the said direct connection of the input and output members of the forward/reverse gear such that the input member of the forward/reverse gear drives the output member of the forward/reverse gear via said planetary gear in a reverse direction, a control means for disengaging the first coupling means during the change between the connection of said second coupling means and connection of said third coupling means, said second coupling means including a sleeve element which constitutes the direct connection of said input and output members of the forward/reverse gear in said second coupling engaged position, a spring continuously urging the sleeve element to drivingly engage said input and output members together for forward rotation, a power means for concurrently moving the sleeve in opposition to said spring to disengage the second coupling means and also cause engagement of the third coupling means to prevent rotation of the planetary gear carrier.

2. The combination according to claim 1 including a servo-motor operable to engage and disengage the third coupling means.

3. The combination according to claim 2, wherein said servo motor includes means for engaging the third coupling means to engage the planetary gear carrier with a stationary part of the transmission simultaneously as it disengages the second coupling means from the forward drive position.

4. The combination according to claim 1, said planetary gear transmission including a disc, one face of which engages a radial projection on the sleeve, and said power means being a servo motor acting on the disc to move the same axially to engage a fixed part of the transmission, the connection between the disc and the stationary part of the transmission constituting the third coupling means, and said disc continuously acting through the said radial projection to hold the sleeve to disengage the second coupling means.

5. The combination according to claim 4, wherein the sleeve is formed with external splines selectively engagable with splines on both the input and output members in the said second coupling engaged position at one extreme axial position of the sleeve and engagable with splines on only one of said input and output members in the disengaged postion of the second coupling means at the other extreme axial position of the sleeve.

6. The combination according to claim 1, said planetary gear carrier including a planetary gear holder having radial passages, a cut-out disc with spokes extending radially between inner and outer rings thereof and matable in the recesses of the planetary gear holder, said disc and said planetary gear holder being coaxial and said spokes positioned to transmit torque from the outer ring to the planetary gear holder, and said disc connecting the planetary gear holder to a relatively stationary part of the transmission when the third coupling means is engaged.

7. The combination according to claim 6, said disc being movable axially relative to the planetary gear holder and capable of transmitting torque to the planetary gear holder in all axial positions of the disc.

8. The combination according to claim 1, said control means comprising a fluid actuated control system.

9. The combination according to claim 8 including a fluid operated means for engaging the first coupling means, and wherein the control system includes a first valve movable to a forward drive position, a neutral position and a reverse drive position, said first valve operable to either vent two pipes or to vent one pipe and pass fluid through another, a second valve in the fluid path of said two pipes and controlled as to its position by an element movable with said common means, the second valve including means for passing fluid for forward drive only when the gear transmission is in forward drive position and for passing fluid for reverse drive only when the gear is in the reverse position, the said two pipes extending beyond the second valve and communicating with a first servo motor, said first servo motor acting to move a third valve which controls said fluid operated means for engaging the first coupling means, the first valve being constructed and arranged such that when placed in said neutral position, the pipes operative during forward and reverse drive respectively are both vented, when placed in the forward drive position the reverse pipe is vented and when placed in the reverse drive position, the forward pipe is vented, the pipes for reverse drive located between the first and second valves communicating with said common means which is a second servo motor to engage the third coupling means and disengage the second coupling means to connect the gear transmission in the reverse position.

10. The combination according to claim 9, said planetary gear carrier including a disc and a planetary gear holder, the disc forming a part of the third coupling means and movable axially into a coupling position with a stationary part of the gear transmission against the force of a spring by a pivotally mounted lever actuated by said second servo motor.

11. The combination according to claim 10, wherein the relationship between the force of said spring and the size of the said second servo motor and lever is such that the fluid pressure necessary to actuate the first coupling means is higher than that necessary to engage the third coupling means.

12. The combination according to claim 11, said disc being formed with spokes passing through radial recesses in the planetary gear holder during axial displacement of the disc into and out of said coupling position of the third coupling means.

13. A gear transmission according to claim 1, wherein the input and output members and the planetary gears comprise bevel gears.

14. A transmission according to claim 1, said torque converter having a direct drive clutch and including means for disconnecting the direct drive clutch when the friction clutch is released.

15. The combination according to claim 1, wherein said control means includes a fluid operated device, a valve means for controlling the flow of pressurized fluid to said fluid operated device, and said valve means being operable in response to movement of said power means.

16. The combination according to claim 15, including a manually operated valve for controlling the flow of pressurized fluid to the first said valve means.

* * * * *

UNITED STATES PATENT OFFICE
CERTIFICATE OF CORRECTION

Patent No. 3,734,252      Dated May 22, 1973

Inventor(s) AHLEN, KARL GUSTAV

It is certified that error appears in the above-identified patent and that said Letters Patent are hereby corrected as shown below:

Claim 13, line 1 (at column 6, line 46) please change "A gear transmission" to -- The combination -- .

Claim 14, line 1 (column 6, line 49) please change "A transmission" to --The combination--.

Signed and sealed this 25th day of December 1973.

(SEAL)
Attest:

EDWARD M. FLETCHER, JR.      RENE D. TEGTMEYER
Attesting Officer      Acting Commissioner of Patents